United States Patent
Mirfarshbafan et al.

(10) Patent No.: US 11,979,207 B2
(45) Date of Patent: May 7, 2024

(54) SPARSITY-ADAPTIVE EQUALIZATION FOR COMMUNICATION SYSTEMS

(71) Applicants: Cornell University, Ithaca, NY (US); ETH ZURICH, The Swiss Federal Institute of Technology, Zurich (CH)

(72) Inventors: Seyed Hadi Mirfarshbafan, Zurich (CH); Christoph Studer, Zurich (CH)

(73) Assignees: Cornell University, Ithaca, NY (US); ETH ZURICH, The Swiss Federal Institute of Technology, Zurich (CH)

( * ) Notice: Subject to any disclaimer, the term of this patent is extended or adjusted under 35 U.S.C. 154(b) by 12 days.

(21) Appl. No.: 17/830,407

(22) Filed: Jun. 2, 2022

(65) Prior Publication Data

US 2022/0393727 A1 Dec. 8, 2022

Related U.S. Application Data

(60) Provisional application No. 63/196,284, filed on Jun. 3, 2021.

(51) Int. Cl.
*H04L 1/02* (2006.01)
*H04B 7/0452* (2017.01)
*H04B 7/0456* (2017.01)

(52) U.S. Cl.
CPC ......... *H04B 7/0452* (2013.01); *H04B 7/0456* (2013.01)

(58) Field of Classification Search
CPC .............. H04B 7/0452; H04B 7/04546; H04B 7/0617; H04B 7/0848; H04B 7/0619;
(Continued)

(56) References Cited

U.S. PATENT DOCUMENTS

| 10,608,686 B1 * | 3/2020 | Studer | H04B 1/1027 |
| 2003/0120994 A1 * | 6/2003 | Dent | G06F 7/53 |
| | | | 714/786 |
| 2022/0368583 A1 * | 11/2022 | Timo | H04W 88/085 |

OTHER PUBLICATIONS

Rappaport et al., "Millimeter wave mobile communications for 5G cellular: It will work!," IEEE Access, vol. 1, pp. 335-349, May 2013.

(Continued)

*Primary Examiner* — Khai Tran
(74) *Attorney, Agent, or Firm* — Stanek Lemon Crouse & Meeks, P.A.

(57) ABSTRACT

A wireless communication system can include an antenna and an equalization system. The antenna can be configured to wirelessly receive a data signal from a user equipment (UE). The equalization system can be configured to compensate for distortion incurred by the data signal during propagation. The equalization system can include a set of multiplier circuits. Each multiplier circuit can include a first input, a second input, a multiplier device, and a management circuit. The first input can receive a first input signal that corresponds to the data signal. The second input can receive a second input signal that corresponds to a weighting value assigned to a channel associated with the antenna. The multiplier device can be enabled or disabled. When enabled, the multiplier device can be configured to perform a multiplication operation on the first input signal and the second input signal. When disabled, the multiplier circuit may not perform the multiplication operation. The management circuit can be configured to selectively disable or enable the multiplier device based on the first input signal and/or the second input signal, thereby reducing an effective number of multiplications and offering power savings.

20 Claims, 5 Drawing Sheets

(58) Field of Classification Search
CPC ........ H04B 7/0626; H04L 2025/03426; H04L 25/03891
USPC .......................................... 375/267, 260, 262
See application file for complete search history.

(56) References Cited

OTHER PUBLICATIONS

Rappaport et al., "Overview of millimeter wave communications for fifth-generation (5G) wireless networks—with a focus on propagation models," IEEE Trans. Antennas Propag., vol. 65, No. 12, pp. 6213-6230, Dec. 2017.

Larsson et al., "Massive MIMO for next generation wireless systems," IEEE Commun. Mag., vol. 52, No. 2, pp. 186-195, Feb. 2014.

Sohrabi et al., "Hybrid digital and analog beamforming design for large-scale antenna arrays," IEEE J. Sel. Topics Signal Process., vol. 10, No. 3, pp. 501-513, Apr. 2016.

Heath et al., "An overview of signal processing techniques for millimeter wave MIMO systems," IEEE J. Sel. Topics Signal Process., vol. 10, No. 3, pp. 436-453, Feb. 2016.

Risi et al., "Massive MIMO with 1-bit ADC," arXiv preprint: 1404.7736, Apr. 2014.

Studer et al., "Quantized massive MUMIMO-OFDM uplink," IEEE Trans. Commun., vol. 64, No. 6, pp. 2387-2399, Jun. 2016.

Mirfarshbafan, "Algorithm and VLSI design for 1-bit data detection in massive MIMO-OFDM," IEEE Open J. Circuits Syst. I, vol. 1, pp. 170-184, Sep. 2020.

Castaneda et al., "Finite-alphabet MMSE equalization for alldigital massive MU-MIMO mmWave communication," IEEE J. Sel. Areas Commun., vol. 38, No. 9, pp. 2128-2141, Jun. 2020.

Yan et al., "Performance, power, and area design trade-offs in millimeter-wave transmitter beamforming architectures," IEEE Circuits Syst. Mag., vol. 19, No. 2, pp. 33-58, May 2019.

Skrimponis et al., "Power consumption analysis for mobile mmwave and sub-THz receivers," in 2020 IEEE 6G Wireless Summit, Mar. 2020, pp. 1-5.

Alkhateeb et al., "Channel estimation and hybrid precoding for millimeter wave cellular systems," IEEE J. Sel. Topics Signal Process., vol. 8, No. 5, pp. 831-846, Oct. 2014.

Schniter et al., "Channel estimation and precoder design for millimeter-wave communications: The sparse way," in Proc. Asilomar Conf. Signals, Syst., Comput., Nov. 2014, pp. 273-277.

Deng et al., "mmWave channel estimation via atomic norm minimization for multi-user hybrid precoding," in Proc. IEEE Wireless Commun. Netw. Conf. (WCNC), Apr. 2018, pp. 1-6.

Alkhateeb et al., "Limited feedback hybrid precoding for multi-user millimeter wave systems," IEEE Trans. Wireless Commun., vol. 14, No. 11, pp. 6481-6494, Nov. 2015.

Lee et al., "Channel estimation via orthogonal matching pursuit for hybrid MIMO systems in millimeter wave communications," IEEE Trans. Commun., vol. 64, No. 6, pp. 2370-2386, Jun. 2016.

Mirfarshbafan et al., "Beamspace channel estimation for massive MIMO mmWave systems: Algorithm and VLSI design," IEEE Trans. Circuits Syst. I, pp. 1-14, Sep. 2020.

Abdelghany et al., "Beamspace local LMMSE: An efficient digital backend for mmWave massive MIMO," in Proc. IEEE Int. Workshop Signal Process. Advances Wireless Commun. (SPAWC), Aug. 2019, pp. 1-5.

Mahdavi et al., "Angulardomain massive MIMO detection: Algorithm, implementation, and design tradeoffs," IEEE Trans. Circuits Syst. I, vol. 67, No. 6, pp. 1948-1961, Jan. 2020.

Mirfarshbafan et al., "Sparse beamspace equalization for massive MU-MIMO mmWave systems," in Proc. IEEE Int. Conf. Acoust., Speech, Signal Process. (ICASSP), May 2020, pp. 1773-1777.

Seethaler et al., "Performance and complexity analysis of infinity-norm sphere-decoding," IEEE Trans. Inf. Theory, vol. 56, No. 3, pp. 1085-1105, Mar. 2010.

Mirfarshbafan et al., "SMUL-FFT: A Streaming Multiplierless Fast Fourier Transform," IEEE Transactions on Circuits and Systems—II: Express Briefs, vol. 68, No. 5, May 2021, pp. 1715-1719.

Burkhardt et al., "QuaDRiGa: a MIMO Channel Model for Land Mobile Satellite," Conference Paper EuCAP 2014, Apr. 2014, 5 pages.

Huan et al. "A Low-Power Accelerator for Deep Neural Networks with Enlarged Near-Zero Sparsity," arXiv, May 22, 2017, 5 pages.

Huan et al. "A Multiplication Reduction Technique with Near-Zero Approximation for Embedded Learing in IoT Devices," 29th IEEE International System-on-Chip Conference (SOCC), Seattle, WA Sep. 6-Sep. 9, 2016, 6 pages.

Jaeckel et al. "Quasi Deterministic Radio Channel Generator User Manual and Documentation," Quadriga, Document Revision: v1.2.3-307, Fraunhofer Heinrich Hertz Institute, Apr. 30, 2014, 112 pages.

\* cited by examiner

FIG. 4A
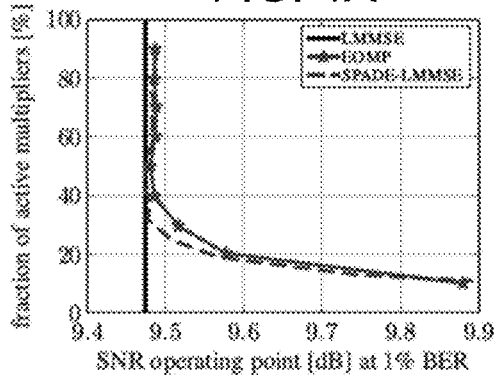
(a) LoS, $B = 128, U = 16$
FIG. 4B
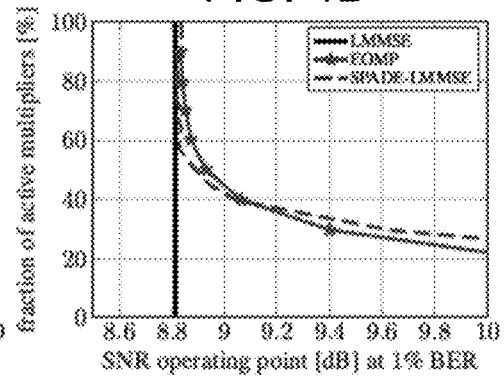
(b) Non-LoS, $B = 128, U = 16$
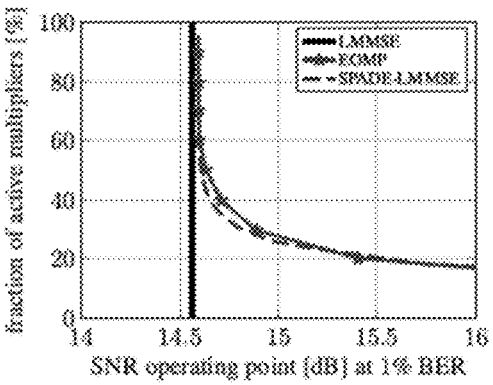
(c) LoS, $B = 128, U = 32$
FIG. 4C
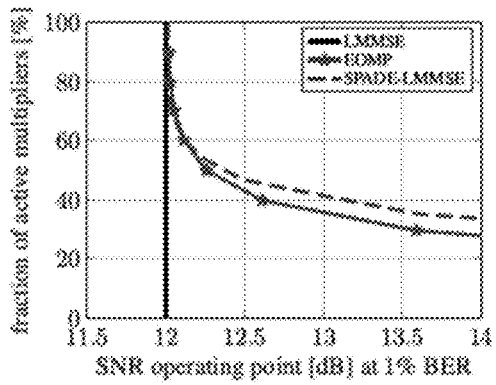
(d) Non-LoS, $B = 128, U = 32$
FIG. 4D

SPARSITY-ADAPTIVE EQUALIZATION FOR COMMUNICATION SYSTEMS

RELATED APPLICATIONS

Any and all applications for which a foreign or domestic priority claim is identified in the Application Data Sheet as filed with the present application are hereby incorporated by reference and made a part of this specification. The present application claims the benefit of and priority to U.S. Provisional Patent Application No. 63/196,284, filed on Jun. 3, 2021, entitled SPADE: SPARSITY-ADAPTIVE EQUALIZATION FOR MMWAVE MASSIVE MU-MIMO, the disclosure of which is hereby incorporated herein by reference in its entirety.

GOVERNMENT CONTRACT

This inventive concept was made with government support under Grant HR0011-18-3-0004 awarded by the Defense Advanced Research Projects Agency (DARPA). The government has certain rights in the invention.

FIELD

The present disclosure generally relates to wireless communication and, more particularly, to techniques for energy-efficient communications.

BACKGROUND

Millimeter wave (mmWave) communication systems have attracted significant interest regarding meeting the capacity requirements of fifth generation (5G) and beyond 5G wireless systems. In general, the mmWave systems have frequency ranges between 30 GHz (10 mm) and 300 GHz (1 mm), where a total of around 250 GHz bandwidths are available. Although the available bandwidth of mmWave frequencies is advantageous, the propagation losses of mmWave communication systems are often significantly larger than that of microwave systems for a point-to-point link.

Multi-user, multiple input, multiple output (MU-MIMO) is a set of multiple-input and multiple-output technologies for multipath wireless communication, in which user equipments (UEs) can concurrently communicate with the base station in the same frequency band or overlapping frequency bands. In MU-MIMO communication systems, the transmissions to several terminals can be overlapped at the same time-frequency resources by using spatial multiplexing.

MU-MIMO and mmWave technologies have attracted significant interest regarding meeting the capacity requirements of fifth generation (5G) and beyond 5G wireless systems. While mmWave communication provides access to large portions of unused bandwidth, it can suffer from high propagation losses. In some cases, MU-MIMO is able to compensate for the high propagation losses via fine-grained beamforming. However, the large number of base station (BS) antennas and/or the high baseband sampling rates can create challenges for mmWave massive MU-MIMO hardware design.

While hybrid digital-analog architectures can reduce the hardware complexity, all-digital architectures with low-resolution data converters and low-resolution baseband processing often achieve higher spectral efficiency, provide more flexibility, and simplify radiofrequency (RF) circuitry and baseband processing. However, it can be difficult to reduce the complexity and power consumption of baseband processing in all-digital BS designs.

SUMMARY

Embodiments of the present disclosure provide a wireless communication system and methods relating thereto. The wireless communication system can include an antenna and an equalization system. The antenna can be configured to wirelessly receive a data signal from a user equipment (UE). The equalization system can be configured to compensate for distortion incurred by the data signal during propagation. The equalization system can include a set of multiplier circuits. Each multiplier circuit can include a first input, a second input, a multiplier device, and a management circuit. The first input can receive a first input signal that corresponds to the data signal. The second input can receive a second input signal that corresponds to a weighting value assigned to a channel associated with the antenna. The multiplier device can be enabled or disabled. When enabled, the multiplier device can be configured to perform a multiplication operation on the first input signal and the second input signal. When disabled, the multiplier circuit may not perform the multiplication operation and/or may output zero instead. The management circuit can be configured to selectively disable or enable the multiplier device based on the first input signal and/or the second input signal, thereby reducing an effective number of multiplications and offering power savings.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

FIGS. 4A-4D illustrates graphs of example simulation results.

DETAILED DESCRIPTION

MmWave channels typically consist of only a few dominant propagation paths. This feature can be exploited to simplify BS design. For example, by taking a spatial discrete Fourier transform (DFT) over the antenna array, which converts the antenna domain into beamspace domain, one can drastically simplify some of the most complex baseband processing tasks, including channel estimation and spatial equalization. Existing beamspace equalizers either suffer from a notable performance degradation compared to antenna domain spatial equalizers or result in high preprocessing complexity.

To address these or other challenges, an equalization system can be implemented to reduce the effective number of multiplications in sparse inner products. The equalization system can compare the entries of two vectors and can adaptively skip, zero-out, or mute scalar multiplications that likely have a minor impact on the final result. For example, the equalization system can include an architecture that adaptively mutes multiplications, which can advantageously reduce power consumption. The disclosed equalization system can advantageously perform on par with the state-of-the-art equalization algorithms.

For purposes of this disclosure, boldface lowercase and uppercase letters represent column vectors and matrices, respectively. Furthermore, for a matrix A, the transpose and Hermitian transpose can be denoted $A^T$ and $A^H$, respectively, the kth column can be denoted by $a_k$, and the Frobenius norm can be denoted $\|A\|_F$. Furthermore, for a vector a, the kth entry can be denoted by $a_k$ the real and imaginary parts can be denoted by $a^R$ and $a^\Im$, respectively, and the $l_\infty$-norm and $l_\infty$-norm can be defined as $\|a\|_\infty \triangleq \max_k |a_k|$ and $\|a\|_\infty \triangleq \max\{\|a^R\|_\infty, \|a^\Im\|_\infty\}$, respectively. Furthermore, the N×N identity and the unitary N×N discrete Fourier transform (DFT) matrices can be denoted by $I_N$ and $F_N$, respectively.

Environment

Figure 1:
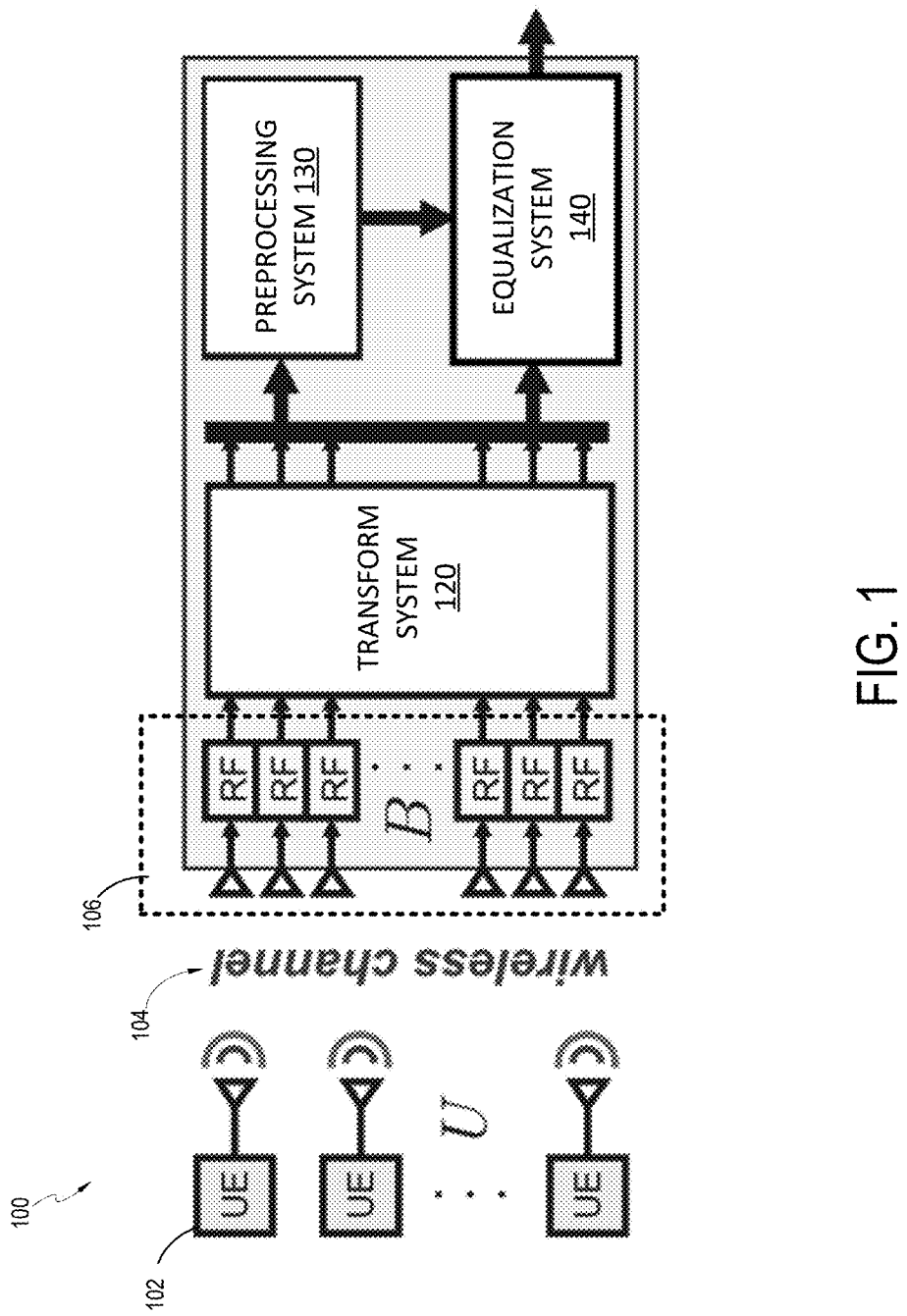
FIG. 1 illustrates an embodiment of an environment relating to wireless communications.

FIG. 1 illustrates an embodiment of an environment 100 relating to wireless communications. The environment 100 includes a plurality of user equipments (UEs) (individually or collectively referred to as UE 102), a wireless channel 104, radio frequency channels 106, a transform system 120, a preprocessing system 130, and an equalization system 140. Fewer, more, or additional components or systems may be used as part of environment 100. In some cases, the environment refers to a mmWave massive MU-MIMO uplink system. However, it will be understood that similar approaches can be utilized in a downlink system.

In some cases, the channel(s) 104 are frequency-flat channels, the UEs 102 are U single-antenna UEs 102 that can transmit information simultaneously or concurrently to the base station 106, which can be a B-antenna base station (BS), in the same frequency band.

The signal received by an antenna of the base station 106 can be referred to as a data signal. In some cases, the data signal can be discussed relative to an antenna domain. For example, an antenna domain received signal vector $\bar{y} \in \mathbb{C}^B$ at the BS as $\bar{y} = \bar{H}s + \bar{n}$, where $\bar{H} \in \mathbb{C}^{B \times U}$ is the uplink channel matrix, $s \in S^U$ is the vector of the UEs' data symbols taken from a discrete constellation set S (e.g., 16-QAM) with $E_s \triangleq E[|s_u|^2]$, u=1, ..., U. The noise vector $\bar{n} \in \mathbb{C}^B$ has i.i.d. circularly symmetric complex Gaussian entries with variance $N_0$. The average receive signal-to-noise ratio (SNR) at the BS can be defined as $SNR \triangleq E_s \|\bar{H}\|_F^2 / BN_0$.

In what follows, we consider mmWave propagation conditions with a B-antenna uniform linear array (ULA). To obtain the beamspace input-output relation, one applies a spatial DFT to the received antenna-domain vector $\bar{y}$ as follows:

$$y = F_B \bar{y} = Hs + n \quad \text{(Equation 1)}$$

where $y = F_B \bar{y}$ is the beamspace receive vector, $H = F_B \bar{H}$ is the (typically sparse) beamspace channel matrix, and n is the beamspace noise vector with the same statistics as the antenna domain noise vector $\bar{n}$. Since the beamspace DFT can be computed for every receive vector $\bar{y}$, a practical system may rely on streaming fast Fourier transforms (FFTs).

To see why the beamspace transform sparsifies mmWave channel matrices, consider the following plane-wave model for the antenna-domain channel vector $\bar{h}_u$ of the uth UE:

$$\bar{h}_u = \sum_{l=0}^{L-1} \alpha_l \bar{a}(\phi_l) \quad \text{(Equation 2)}$$

where L stands for the number of propagation paths, $\alpha_l \in \mathbb{C}$ is the channel gain of the lth propagation path, and $$\bar{a}(\phi_l) = [1, e^{j\phi_l}, e^{j2\phi_l}, \ldots, e^{j(B-1)\phi_l}] \quad \text{(Equation on 3)}$$

where the spatial frequency $\phi_l$ is determined by the lth path's incident angle to the ULA. Since L is small for line-of-sight (LoS) mmWave channels, taking a DFT $h_u = F_B \bar{h}_u$ reveals the sparse structure of such channel vectors, i.e., most of the vector's energy is concentrated on the entries of $h_u$ associated with the spatial frequencies $\phi_l$.

Linear data detection can include at least two phases: (i) preprocessing, which may be performed only once per channel coherence interval and can produce a U×B equalization matrix $W^H$ and (ii) spatial equalization, which can be performed at baseband sampling rate (for each received signal vector y) in order to obtain estimates of the transmitted symbol vectors according to $\hat{s} = W^H y$. In what follows, we focus on beamspace LMMSE equalization for which the equalization matrix is given by:

$$W^H = \left(H^H H + \frac{N_0}{E_s} I_U\right)^{-1} H^H \quad \text{(Equation 4)}$$

In order to support high-bandwidth communication at mmWave frequencies, the spatial equalization stage can be carried out at extremely high baseband sampling rates. Further, to keep power consumption within reasonable bounds, efficient methods to calculate $\hat{s} = W^H y$ can be deployed in practice.

In recent years, a number of sparsity-exploiting beamspace equalization methods have been proposed. All of these methods exploit the fact that for sparse beamspace channel matrices H, the associated LMMSE equalization matrices $W^H$ tend to be sparse as well. This observation enables design of beamspace equalization algorithms that produce sparse equalization matrices $\tilde{W}^H$ with a given density coefficient $\delta \triangleq \|\tilde{W}^H\|_0 / (BU)$, where $\|\tilde{W}\|_0$ the number of nonzero entries of $\tilde{W}$. Such sparsity-exploiting spatial equalizers can reduce the number of multiplications required when calculating $\hat{s} = W^H y$, which can advantageously reduce power consumption and/or implementation complexity. Among such methods, the entrywise orthogonal matching pursuit (EOMP) proposed can achieve a highest sparsity (lowest $\delta$) and hence highest complexity reduction during spatial equalization. EOMP and related algorithms, however, can considerably increase the complexity of preprocessing, resulting in inefficient circuitry. To address these or other concerns, the disclosed equalization system 140 (sometimes referred to SPADE-LMMSE or SPADE) can be a sparsity-adaptive spatial equalization method that competes with or beats EOMP in terms of complexity reduction during spatial equalization while directly using the conventional LMMSE equalization matrix which means that the preprocessing complexity does not increase.

Sparsity-Adaptive Equalization

Consider the inner product of two B-dimensional real-valued vectors $\langle w, y \rangle = \sum_{b=1}^{B} w_b y_b$. Intuitively, if B is large, then we can skip partial products $w_b y_b$ of small magnitude, without incurring a large relative error in the result, assuming that the exact result is bounded away from zero. However, we cannot eliminate partial products based on their magnitude, as this requires actually performing the multiplication. Therefore, we propose to set thresholds for the absolute values of the two operands $w_b$ and $y_b$, and skip (or mute) multiplications if the absolute values of both operands are below their respective thresholds. The same approach can be extended to a complex valued case, noting that each complex-valued inner product can be decomposed into four real-valued inner products. In mmWave channels, the rows $w_u^H$, u=1, . . . , U of beamspace LMMSE matrices $W^H$ and the receive vectors y can exhibit sparsity. Therefore, a large number of partial products when computing $\hat{s}_u = w_u^H y$, u=1, . . . U, will be small; hence, a large number of multiplications can advantageously be skipped. In some cases, for example to simplify hardware implementation, the system can include two fixed thresholds $\tau_y \in \mathbb{R}$ and $\tau_w \in \mathbb{R}$, for the real and imaginary parts of all entries of the receive vector y and the equalization matrix $W^H$, respectively. In some cases, one or both of the threshold can be dynamic.

Thresholds

The thresholds $\tau_y$ and $\tau_w$ can be used to trade arithmetic precision for reduction in the effective number of multiplications. Setting these thresholds close to zero will result in high precision but will increase the number of active multiplications. In contrast, setting these thresholds to large values will result in precision loss, but will lower the number of active multiplications. In some cases, one or more of the following techniques are used to determine the thresholds. First, since we use a single threshold $\tau_y$ for all the entries of y, and the statistics of y change dynamically, we can determine a fixed threshold $\tau'_y$, and then set $\tau_y = \|y\|_\infty \tau'_y$ in order to incorporate fluctuations of y into $\tau_y$. Second, since we use a single threshold $\tau_w$ for all the entries of $W^H$, we scale the rows $w_u^H$, u=1, . . . , U, so that their $l_\infty$-norms are equal. A row-scaling scheme can reduce the dynamic range of the entries of equalization matrices. For SPADE, we scale the rows of the LMMSE equalization matrix according to $V^H = \text{diag}(\alpha)W^H$ such that the rows $v_u^H$, u=1, . . . , U, of the scaled matrix $V^H$ satisfy $\|v_u\|_\infty < 1$. This can be accomplished by $\alpha_u = 1/(\|w_u^H\|_\infty + \varepsilon)$, where $\varepsilon > 0$ is a small constant that ensures that $\|v_u\|_\infty$ is just below one. With this approach, estimates of the transmit vector are computed as $\hat{s} = \text{diag}(\alpha)^{-1} V^H y$, which corresponds to post-multiplying the uth entry of $V^H y$ by $1/\alpha_u$ for u=1, . . . , U. The threshold $\tau_w$ is applied to the entries of the scaled matrix $V^H$. The first threshold $\tau_y$ and the second threshold $\tau_w$ can be selected such that application of the first threshold and the second threshold results in a precision loss of the equalization system 140 that does not exceed a third threshold.

Architecture

Figure 2:
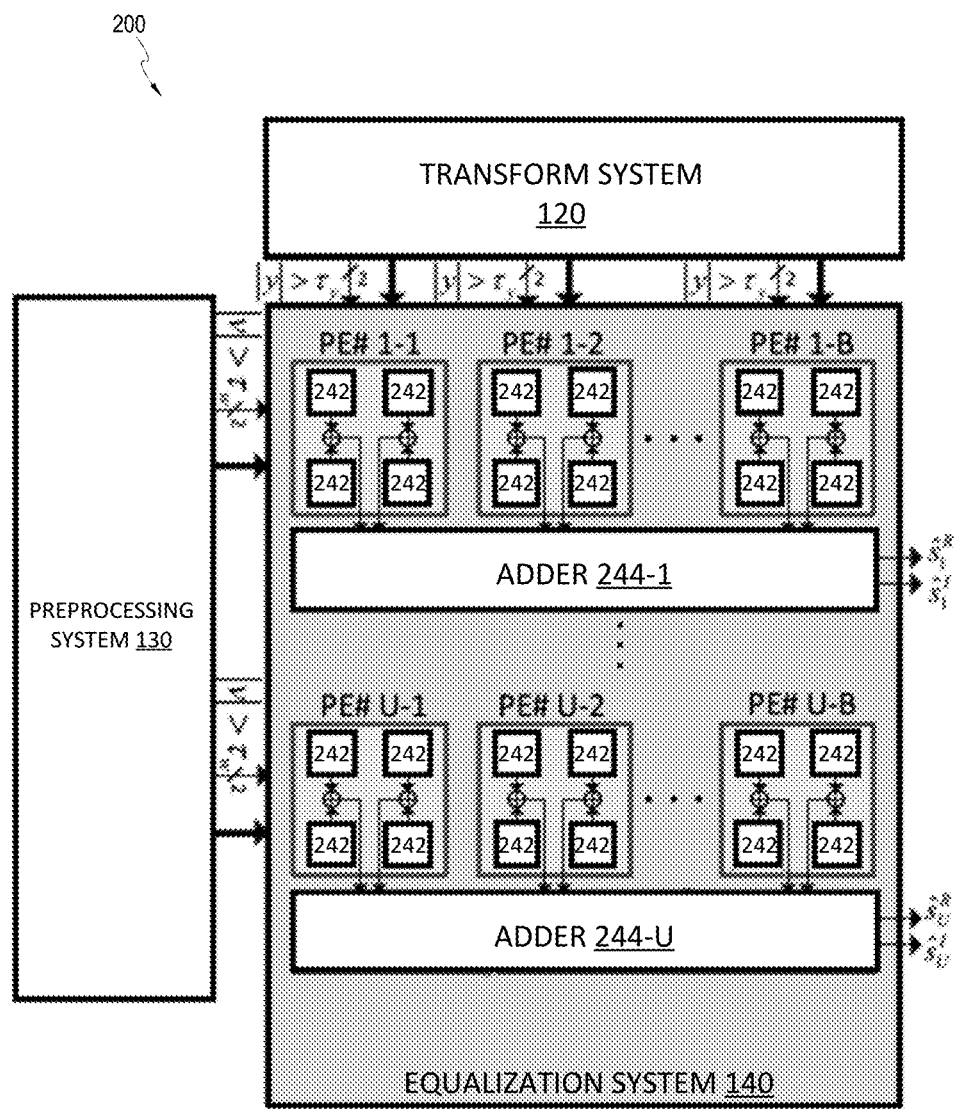
FIG. 2 shows a high-level architecture of a wireless communication system.

FIG. 2 shows a high-level architecture of a wireless communication system 200. The wireless communication system 200 includes the transform system 120, the preprocessing system 130, and the equalization system 140. Fewer, more, or additional components or systems may be used as part of the wireless communication system 200. In some cases, the equalization system 140 includes a fully unrolled beamspace LMMSE equalizer employing SPADE to adaptively mute multiplier circuits 242 (also referred to as multipliers or mutable multipliers). In high-bandwidth mmWave systems with multi-GHz baseband sampling rates, fully unrolled architectures can be a good choice to deliver the desired throughput while minimizing data buffering and control overhead.

In FIG. 2, the preprocessing system 130 receives beamspace channel estimates and computes $V^H$ once per channel coherence interval. The preprocessing system 130 can also perform the comparison of real and imaginary entries of $V^H$ with $\tau_w$ and provides the comparison bits to the equalization system 140. The transform system 120 can take antenna domain received vectors $\bar{y}$ and produce the beamspace domain vectors y, along with the comparison bits for each real and imaginary part of entries of y with $\tau_y$. The equalization system 140 (sometimes referred to as a matrix-vector multiplication engine) comprises U inner product engines, each consisting of B processing elements (PEs). Each PE is a complex-valued multiplier with four real-valued multiplier circuits 242. As shown, the equalization system 140 can include one or more adder trees 244-U electrically coupled to an output of each of the set of multiplier circuits, where an adder tree is configured to add output signals of the set of multiplier circuits to generate a signal corresponding to a UE.

Figure 3:
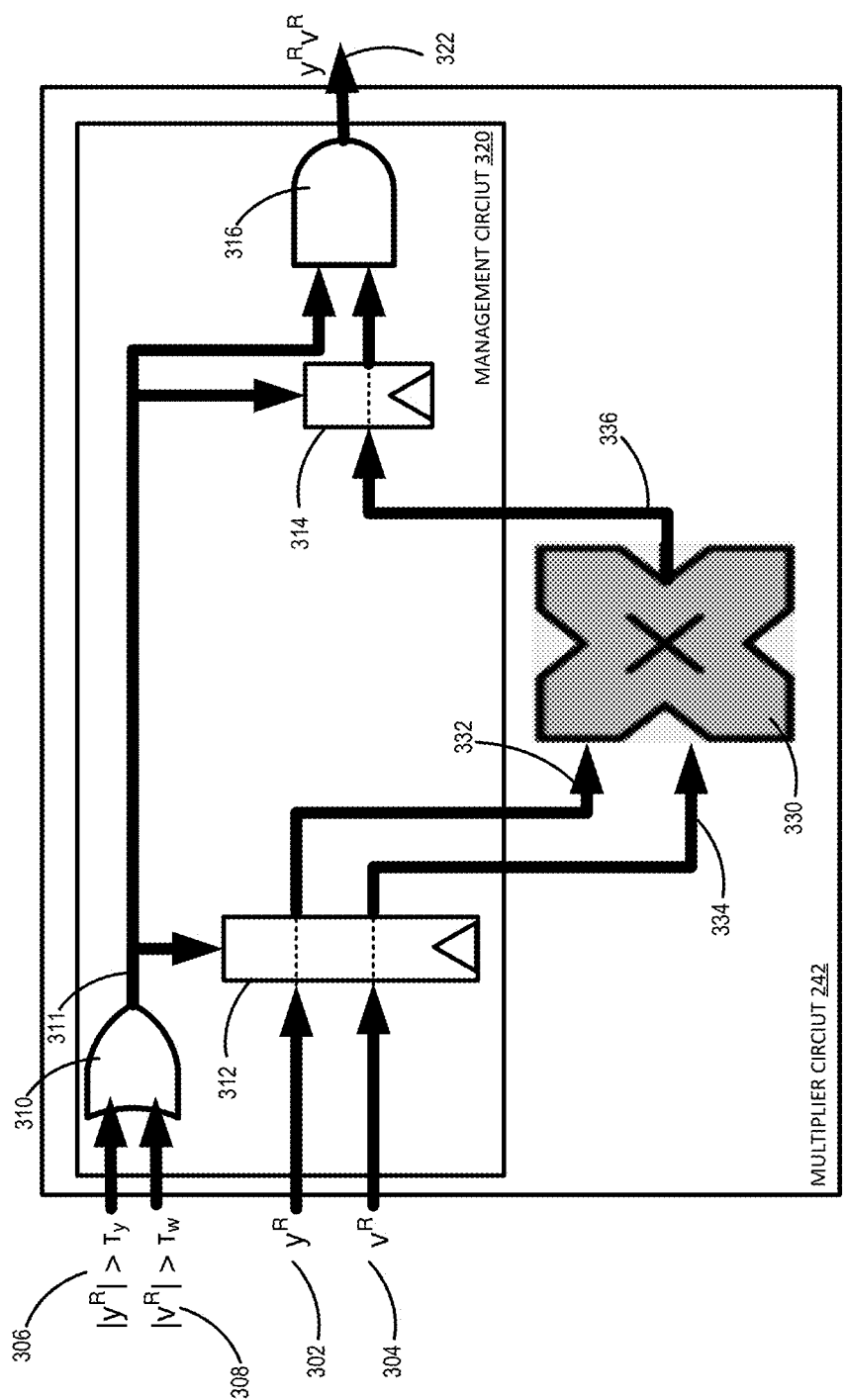
FIG. 3 illustrates an example architecture of a multiplier circuit.

FIG. 3 illustrates an example architecture of an example multiplier circuit 242. As shown, the multiplier circuit 242 includes a management circuit 320 and a multiplier device 330. Furthermore, multiplier circuit 242 can include a first input (receiving signal 302), a second input (receiving signal 304), a third input (receiving signal 306), and/or a fourth input (receiving signal 308). In some cases, third input is based on the first input and the fourth input is based on the second input.

The management circuit 320 can include a first logic circuit element 310 that implements a logical disjunction to output a logical high signal responsive to any logical high input. For example, the logic circuit element 310 can include an OR gate that receives the signals 306 and 308. In some cases, the management circuit 320 can disable a multiplier device 330 by outputting a logical low signal via output 311. As a corollary, in some cases, the management circuit 320 can enable a multiplier device 330 by outputting a logical high signal via output 311.

The management circuit 320 can include a second logic circuit element 316 that implements a logical disjunction to output a logical high signal responsive to any logical high input. For example, the logic circuit element 310 can include an AND gate.

As shown, in some cases, the management circuit 320 can include a first enable device 312 and/or a second enable device 314. In some cases, the first enable device 312 and/or a second enable device are registers. For example, the multiplier circuit 242 can conditionally disable or enable the registers before and/or after the multiplier device 330 if the comparison bits (e.g., signals 306, 308) indicate that both operands have values (e.g., absolute values) smaller than their thresholds. As shown, the registers can function according to a clock.

The multiplier device 330, when enabled, can be configured to perform a multiplication operation on two or more input signals 332, 334, which can correspond to the first and second input signals 302, 304. In some cases, when disabled, the multiplier device 330 does not perform the multiplication operation. In some cases, the multiplier device 330 consumes more energy when performing the multiplication operation than when not performing the multiplication operation.

Referring to FIGS. 2 and 3, at the beginning of each channel coherence interval, the weight registers of the PEs are loaded with the entries of $V^H$ and the comparison bits provided by the preprocessing system 130. Then, for each beamspace receive vector coming from the transform system 120, each multiplier circuit 242 conditionally disables the registers before and after the multiplier device 330 if the comparison bits indicate that both operands have absolute values smaller than their thresholds. Consequently, the equalization system 140 adaptively saves power by nulling the switching activity of unused multiplier devices 330—this will reduce the dynamic power consumption. For correct functionality, the output of each multiplier circuit 242 can be set to zero, which is implemented by the AND gate 316 at the output of each multiplier circuit 242 as shown in FIG. 3. The number of muted multiplier circuits 242 can depend on the sparsity of y and $v_u^H$, u=1, . . . , U, which can be determined by the channel conditions. For example, in a system with B=128 BS antennas and U=16 UEs with LoS channel conditions, it is possible to mute 80% of the multiplications while incurring no more than 0.1 dB SNR loss at an uncoded bit-error-rate (BER) of 1%.

In some cases, LMMSE preprocessing by the preprocessing system 130 may be carried out only once per channel coherence interval and the spatial FFT implemented by the transform system 120 can be implemented efficiently using the fully unrolled multiplier-less architecture. In some cases, the equalization system 140 can operate constantly and at baseband sampling rate, which can emphasize the importance of saving power consumption in the equalization system 140.

Example Simulation Results

FIGS. 4A-4D illustrates graphs of example simulation results, which illustrate an example performance-complexity trade-off offered by the equalization system 140. Consider a mmWave massive MU-MIMO base station with a B=128 antenna λ/2-spaced ULA and 16-QAM transmission from U∈{16,32} single-antenna UEs. Further consider Monte-Carlo simulations with LoS and non-LoS channels generated by the QuaDRiGa mmMAGIC UMi model at a carrier frequency of 60 GHz. The UEs are placed randomly in a 120° sector within 10 m to 110 m from the BS array, with a minimum of 1° angular separation. We use power control so that the variation in receive power of UEs is limited to ±3 dB. For channel estimation, we can use pilot-based least squares (LS) followed by BEACHES. We simulated the uncoded BER for (i) conventional antenna domain LMMSE equalization, (ii) EOMP-based beamspace equalization with density coefficient δ ranging from 10% to 90%, and (iii) beamspace SPADE-LMMSE with different values for the threshold pair $(\tau'_y, \tau_w)$. The values of the threshold pair $(\tau'_y, \tau_w)$ corresponding to each simulated point of the equalization system 140 curves in FIGS. 4A-4D are obtained via a 2-dimensional grid search over a range of plausible candidates and picking the Pareto-optimal parameters.

FIGS. 4A-4D show the SNR operating point required to achieve an uncoded BER of 1% versus the fraction of active multipliers (which coincides with the density coefficient δ of EOMP). We see that the performance of the equalization system 140 is very close to EOMP, meaning that for a given fraction of active multipliers, they both achieve an uncoded BER of 1% at similar SNRs. We also see that the equalization system 140 and EOMP require fewer active multipliers for LoS channels than for non-LoS channels. For a negligible SNR loss (compared to antenna domain LMMSE), up to 80% of multipliers can be muted in a 128×16 LoS scenario, whereas about 50% can be muted for a non-LoS scenario. Note that the SNR operating point required to achieve an even lower uncoded BER of 0.1% behaves very similarly but is omitted due to space constraints.

An advantage of the equalization system 140 over EOMP is the fact that EOMP generally requires external control of the density coefficient δ dependent on the channel conditions to avoid a large SNR loss. In contrast, the equalization system 140 can simply use the same pair of threshold values $(\tau'_y, \tau_w)$ while automatically adapting to the required number of multipliers based on the instantaneous channel conditions. For example, in the 128×16 LoS setting, choosing $(\tau'_y=\frac{1}{2}$ and $\tau_w=\frac{1}{20})$ results in an SNR gap of only 0.25 dB with respect to antenna domain LMMSE equalization while requiring only 17% active multipliers. The same threshold parameters in the non-LoS setting results in an SNR gap of less than 0.15 dB while requiring only 45% active multipliers. Another advantage is that the equalization system 140 can use conventional LMMSE preprocessing whereas the preprocessing complexity of EOMP is considerably higher. The preprocessing complexity of EOMP—measured in terms of the number of real-valued multiplications—is about 15× higher than that of conventional LMMSE for a B=128 BS antenna and U=16 UE system with density factor δ=20%.

The equalization system 140 can adaptively reduce the number of multiplications based upon the instantaneous channel conditions. Among other advantages, the equalization system 140 can offer one or more of the following: (i) the preprocessing complexity is approximately equal to the antenna-domain LMMSE equalization, (ii) the performance degradation with respect to antenna-domain LMMSE equalization is little or negligible for suitably chosen thresholds, and/or (iii) the equalization system 140 adaptively reduces complexity and/or lowers dynamic power consumption based on the instantaneous channel conditions. For LoS and non-LoS mmWave massive MU-MIMO channel models, the equalization system 140 performs on par with, or better than, EOMP, but requires significantly lower preprocessing complexity. The equalization system 140 is not only suitable for spatial equalization in mmWave massive MU-MIMO systems but finds use in many other applications that carry out approximate sparse matrix-vector products.

Flow Diagram

Figure 5:
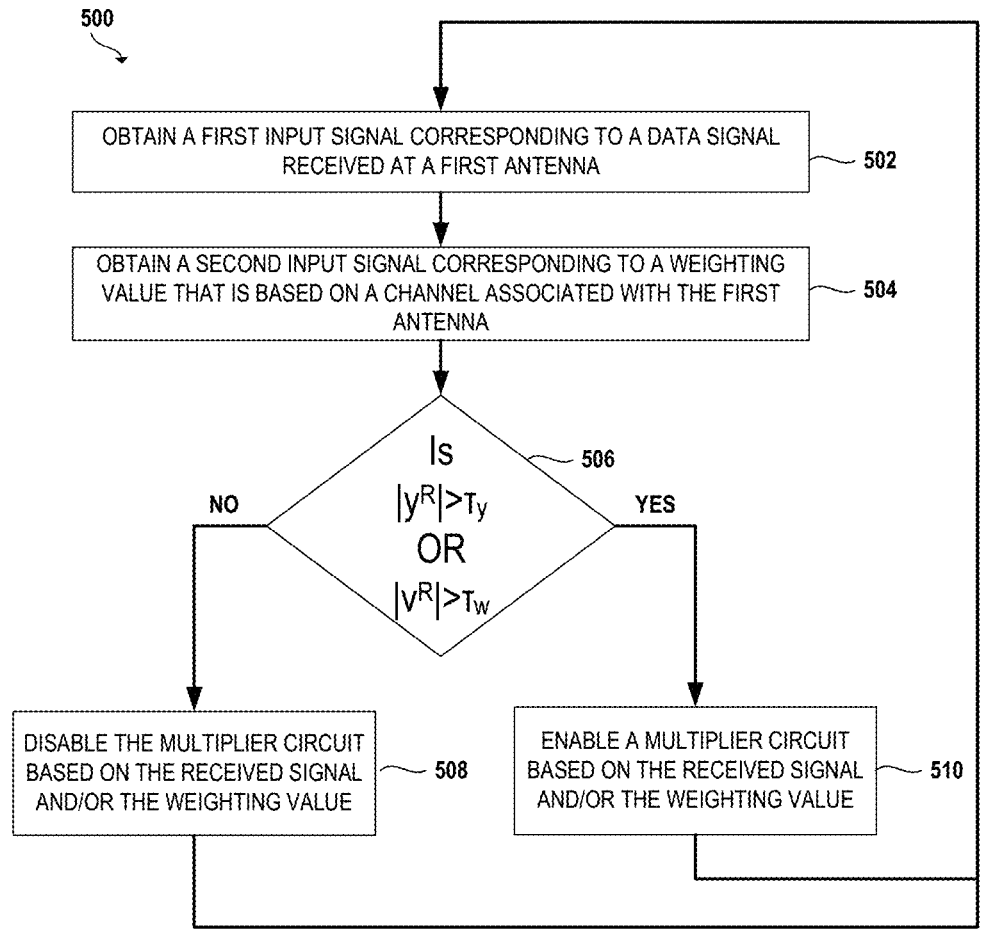
FIG. 5 is a flow diagram illustrative of an embodiment of a routine implemented by the wireless communication system.

FIG. 5 is a flow diagram illustrative of an embodiment of a routine 500 implemented by the wireless communication system 100. Although described as being implemented by the wireless communication system 100, it will be understood that one or more elements outlined for routine 500 can be implemented by one or more computing devices/components that are associated with the wireless communication system 100, such as, but not limited to, the antenna system, the transform system 120, the preprocessing system 130, and/or the equalization system 140.

Although the routine 500 is generally described as being associated with a single multiplier circuit 242, it will be understood that the routine 500 can be performed for multiple multiplier circuits 242, such as tens, hundreds, thousands, or millions or multiplier circuits 242. For example, in some cases, the wireless communication system 100 can perform the routine 500 for tens, thousands, or millions of multiplier circuits 242 concurrently or successively. Furthermore, the routine 500 can be performed multiple times, such as tens, hundreds, or thousands of times, for the multiplier circuit 242.

At block 502, the system 100 obtains one or more input signals. The one or more input signals can correspond to a data signal that was received at a first antenna 106 (or from multiple antennas). For example, the antenna 106 can be configured to wirelessly receive the data signal from one or more user equipment. In some cases, the system 100 obtains the data signal, or multiple data signals, across multiple frequency bands. In some cases, the system 100 obtains the data signal, or multiple data signals, from multiple UEs.

As described, in some cases, the system 100 includes a transform system preprocessing system (such as transform system 120) that applies a transform to the data signal to generate a transformed data signal. In some cases, the one or more input signals is, or corresponds to, the transformed data signal. The applied transform can vary across embodiments. For example, in some cases, the applied transform is at least one of a Fourier transform (FT), Fast Fourier transform (FFT), or a beamspace transform (BT). As a non-limiting example, in some cases, the data signal received by the antenna is an antenna domain signal and the transform system 120 coverts the antenna domain signal into a beamspace domain signal. In some such cases, the one or more input signals can correspond to the beamspace domain signal.

At block 504, the system 100 obtains a second input signal. In some cases, the second input signal is, or corresponds to, a weighting value that is assigned to a channel associated with the antenna 106. In some cases, the weighting value can be assigned or determined based on an equalization matrix. For example, as described herein, the system 100 can include a preprocessing system (such as preprocessing system 130) that determines the weighting value assigned to the channel associated with the first antenna 106. As described herein, the preprocessing system is a linear minimum mean square error (LMMSE) preprocessing block.

At block 506, the system 100 determines whether a first value (e.g., $y^R$, $|y^R|$, etc.) associated with the first input signal 302 satisfies a first threshold (e.g., $\tau'_y$ or $\tau_y$) and/or whether a second value (e.g., $v^R$, $|v^R|$, etc.) associated with the second input signal 304 satisfies a second threshold (e.g., $\tau_w$). In some cases, the second value satisfies the second threshold if the second value is greater than or equal to the second threshold. In some cases, if the first value does not satisfy the first threshold and the second value does not satisfy the second threshold, the system transitions to block 508. In some cases, if either the first value satisfies the first threshold or the second value satisfies the second threshold, the system transitions to block 510.

At block 508, the system 100 disables the multiplier device 330 based on the first input signal 302 and/or the second input signal 304. For example, the management circuit 330 can disable the multiplier device 330 when a first value associated with the first input signal 302 does not satisfy a first threshold and a second value associated with the second input signal 304 does not satisfy the second threshold. In some cases, the management circuit 330 can perform this comparison itself. In some cases, the management circuit 330 receives an indication of the comparison as input. For example, the transform system 120 can individually compare real and/or imaginary entries relating to the first input signal with the first threshold and can provide comparison bits to the multiplier circuit 242 (e.g., to the management circuit 330). As another example, the preprocessing system 130 can individually compare real and/or imaginary entries relating to the second input signal with the second threshold and can provide comparison bits to the multiplier circuit 242 (e.g., to the management circuit 330).

At block 510, the system 100 enables the multiplier device 330 based on the first input signal 302 and/or the second input signal 304. For example, the management circuit 330 can enable the multiplier device 330 when a first value associated with the first input signal 302 satisfies a first threshold (e.g., $\tau'_y$ or $\tau_y$). As another example, the management circuit 330 can enable the multiplier device 330 when a second value associated with the second input signal 304 satisfies a second threshold (e.g., $\tau_w$).

In certain embodiments, any blocks 502, 504, 506, 508, or 510 may be omitted, occur concurrently, or occur in a different order, as desired. For example, in some cases, only one of blocks 508 and 510 may occur. Furthermore, it will be understood that the routine 500 may include fewer, more, or different blocks.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that the methods/steps described herein may be performed in any sequence and/or in any combination, and the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A wireless communication system comprising:
an antenna configured to wirelessly receive a data signal from a user equipment (UE); and
an equalization system configured to compensate for distortion incurred by the data signal during propagation, wherein the equalization system comprises a set of multiplier circuits, wherein each multiplier circuit comprises:
a first input for receiving a first input signal, the first input signal corresponding to the data signal;
a second input for receiving a second input signal, the second input signal corresponding to a weighting value assigned to a channel associated with the antenna, wherein the weighting value is determined based on an equalization matrix;
a multiplier device, wherein when enabled the multiplier device is configured to perform a multiplication operation on the first input signal and the second input signal, wherein when disabled the multiplier circuit does not perform the multiplication operation, wherein the multiplier circuit consumes more energy when performing the multiplication operation than when not performing the multiplication operation; and
a management circuit electrically coupled to the multiplier device and configured to selectively disable or enable the multiplier device based on at least one of the first input signal or the second input signal, wherein the management circuit enables the multiplier device when a first value associated with the first input signal satisfies a first threshold, wherein the management circuit enables the multiplier device when a second value associated with the second input signal satisfies a second threshold, and wherein the management circuit disables the multiplier device when the first value does not satisfy the first threshold and the second value does not satisfy the second threshold.

2. The wireless communication system of claim 1, further comprising a transform system configured to apply a transform to the data signal to generate a transformed data signal, wherein the first input signal corresponds to the transformed data signal.

3. The wireless communication system of claim 2, wherein the transform is at least one of a Fourier transform (FT), Fast Fourier transform (FFT), or a beamspace transform (BT).

4. The wireless communication system of claim 1, wherein the data signal is an antenna domain signal, wherein the wireless communication system further comprises a transform system configured to covert the antenna domain signal into a beamspace domain signal, wherein the first input signal corresponds to the beamspace domain signal, and wherein the first input is electrically coupled to an output of the transform system.

5. The wireless communication system of claim 4, wherein the transform system is further configured to:
individually compare real or imaginary entries of the beamspace domain signal with the first threshold; and
provide comparison bits to a respective multiplier circuit.

6. The wireless communication system of claim 1, further comprising a preprocessing system configured to determine the weighting value assigned to the channel associated with the antenna, wherein the second input is electrically coupled to an output of the preprocessing system.

7. The wireless communication system of claim 6, wherein the preprocessing system is further configured to:
individually compare real or imaginary entries of the weighting value with the second threshold; and
provide comparison bits to a respective processing circuit.

8. The wireless communication system of claim 6, wherein the preprocessing system is a linear minimum mean square error (LMMSE) preprocessing block.

9. The wireless communication system of claim 1, wherein the management circuit is a logic circuit that implements a logical disjunction to output a logical high signal responsive to any logical high input, and wherein the management circuit disables a respective multiplier circuit by outputting a logical low signal.

10. The wireless communication system of claim 1, wherein the management circuit includes an OR gate.

11. The wireless communication system of claim 1, wherein each multiplier circuit further comprises a logic circuit that implements a logical disjunction to output a logical high signal responsive to any logical high input, wherein the logic circuit has a first input electrically coupled to an output of the management circuit, wherein a second input of the logic circuit is an output of a respective multiplier circuit, and wherein the output of the logic circuit is a logical low when the output of the management circuit is a logical low output.

12. The wireless communication system of claim 11, wherein the logic circuit is an AND gate.

13. The wireless communication system of claim 1, wherein the first value is a magnitude of the first input signal or the second value is a magnitude of the second input signal.

14. The wireless communication system of claim 1, wherein the first threshold and the second threshold are selected such that application of the first threshold and the second threshold results in a precision loss of the equalization system that does not exceed a third threshold.

15. The wireless communication system of claim 1, wherein the equalization system further comprises an adder tree electrically coupled to an output of each of the set of multiplier circuits, wherein the adder tree is configured to add output signals of the set of multiplier circuits to generate a signal corresponding to the UE.

16. The wireless communication system of claim 1, wherein the wireless communication system is at least one of a millimeter-wave (mmWave) communication system or a massive multiuser (MU) multiple-input multiple-output (MIMO) communication system.

17. The wireless communication system of claim 1, wherein the set of multiplier circuits is a first set of multiplier circuits, wherein the equalization system further comprises one or more additional sets of multiplier circuits, wherein the first set of multiplier circuits and the one or more additional sets of multiplier circuits form a plurality of sets of multiplier circuits, wherein each set of multiplier circuits of the plurality of sets of multiplier circuits is associated with the UE.

18. The wireless communication system of claim 17, wherein the UE is a first UE, wherein the plurality of sets of multiplier circuits is a first plurality of sets of multiplier circuits, wherein the wireless communication system further comprises a second plurality of sets of multiplier circuits, wherein each set of multiplier circuits of the second plurality of sets of multiplier circuits is associated with a second UE.

19. The wireless communication system of claim 18, further comprising a plurality of antennas, wherein each antenna of the plurality of antennas is configured to wirelessly receive a respective data signal from one or more UEs, wherein the one or more UEs includes the second UE.

20. A method comprising:
obtaining a first input signal, the first input signal corresponding to a data signal received at an antenna of a wireless communication system from a user equipment (UE);
obtaining a second input signal, the second input signal corresponding to a weighting value assigned to a channel associated with the antenna, wherein the weighting value is determined based on an equalization matrix; and
using a management circuit, selectively disabling or enabling a multiplier device based on the first input signal and the second input signal, wherein the management circuit enables the multiplier device when a first value associated with the first input signal satisfies a first threshold, wherein the management circuit enables the multiplier device when a second value associated with the second input signal satisfies a second threshold, wherein the management circuit disables the multiplier device when the first value does not satisfy the first threshold and the second value does not satisfy the second threshold, wherein when enabled the multiplier device is configured to perform a multiplication operation on the first input signal and the second input signal, wherein when disabled the multiplier device does not perform the multiplication operation, and wherein the multiplier device consumes more energy when performing the multiplication operation than when not performing the multiplication operation.

* * * * *